(12) United States Patent
Long et al.

(10) Patent No.: US 10,082,398 B2
(45) Date of Patent: Sep. 25, 2018

(54) METHOD AND DEVICE FOR INTELLIGENTLY GUIDING A USER TO RIDE ELEVATOR/ESCALATOR

(71) Applicant: Xiaomi Inc., Beijing (CN)

(72) Inventors: Fei Long, Beijing (CN); Zhijun Chen, Beijing (CN); Tao Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 104 days.

(21) Appl. No.: 15/245,998

(22) Filed: Aug. 24, 2016

(65) Prior Publication Data

US 2017/0122744 A1     May 4, 2017

(30) Foreign Application Priority Data

Oct. 29, 2015   (CN) .......................... 2015 1 0717742

(51) Int. Cl.

| G01C 21/26 | (2006.01) |
| G01C 21/34 | (2006.01) |
| H04W 4/04 | (2009.01) |
| G01C 21/20 | (2006.01) |
| G01C 21/00 | (2006.01) |

(52) U.S. Cl.
CPC ......... *G01C 21/206* (2013.01); *G01C 21/005* (2013.01); *H04W 4/04* (2013.01)

(58) Field of Classification Search
CPC ...... G01C 21/206; G01C 21/005; H04W 4/04
See application file for complete search history.

(56) References Cited

U.S. PATENT DOCUMENTS

| 2011/0246062 A1 | 10/2011 | Whitmyer, Jr. |
| 2013/0205257 A1 | 8/2013 | Albright |
| 2014/0372032 A1 | 12/2014 | Canner et al. |
| 2015/0149133 A1* | 5/2015 | Do ....................... G01C 21/206 |
| | | 703/6 |
| 2015/0185022 A1 | 7/2015 | Yoo et al. |

FOREIGN PATENT DOCUMENTS

| CN | 103267526 A | 8/2013 |
| CN | 103674017 A | 3/2014 |
| CN | 103900600 A | 7/2014 |
| CN | 104280028 A | 1/2015 |
| CN | 104843552 A | 8/2015 |
| JP | 2006-023094 A | 1/2006 |
| JP | 2013-033122 A | 2/2013 |

(Continued)

OTHER PUBLICATIONS

International Search Report dated Aug. 8, 2016 for International Application No. PCT/CN2015/099406, 5 pages.

(Continued)

*Primary Examiner* — Yonel Beaulieu
*Assistant Examiner* — Martin A Weeks
(74) *Attorney, Agent, or Firm* — Brinks Gilson & Lione

(57) ABSTRACT

The present disclosure relates to a method and a device for intelligently guiding a user to ride an elevator/escalator in a building complex such as a shopping mall. Based on a current location and floor level of a user in the building complex and a target floor and location, and a 3D model of the building complex, either an elevator path or escalator path may be automatically and intelligently selected from possible paths.

17 Claims, 17 Drawing Sheets

(56) References Cited

FOREIGN PATENT DOCUMENTS

| JP | 2013-053982 A | 3/2013 |
| JP | 2015-017922 A | 1/2015 |
| WO | WO 2014-132802 A1 | 9/2014 |

OTHER PUBLICATIONS

English Translation of International Search Report dated Aug. 8, 2016 for International Application No. PCT/CN2015/099406, 4 pages.
Extended European Search Report dated Feb. 16, 2017 for European Application No. 16190955.1, 8 pages.
Office Action dated Aug. 28, 2017 for Chinese Application No. 201510717742.0, 5 pages.
Office Action dated Oct. 10, 2017 for Korean Application No. 10-2016-7004657, 6 pages.
Office Action dated Jan. 23, 2018 for Japanese Application No. 2017-547056, 3 pages.

\* cited by examiner

METHOD AND DEVICE FOR INTELLIGENTLY GUIDING A USER TO RIDE ELEVATOR/ESCALATOR

CROSS-REFERENCE TO RELATED APPLICATION

The present application is based on and claims priority to Chinese Patent Application No. 201510717742.0 filed Oct. 29, 2015, the entire contents of which are incorporated herein by reference.

TECHNICAL FIELD

The present disclosure generally relates to the field of computer communication technology and smart devices, and more particularly, to a method and a device for intelligently guiding a user to ride an elevator/escalator.

BACKGROUND

With the advances in geo-location and computer technologies, indoor navigation in large building complexes such as a shopping mall is made possible by the development of Geography Information System (GIS) and its derivatives such as "Digital Earth", "Digital City", and "Digital Building". Indoor navigation systems may bring convenience to users, e.g., shoppers, who may otherwise waste significant amount of time locating stores rather than shopping. Locations of facilities such as transporting carriers including but not limited to escalators, elevators, and restrooms in large buildings may be confusing at times and an indoor navigation system may help accurately identify the shortest and appropriate route to a desired destination.

SUMMARY

In view of the above, the present disclosure provides methods and devices for intelligently guiding a user to ride an elevator/escalator. This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for guiding a user to ride a transporting carrier by a mobile terminal in a building complex is disclosed. The method includes determining a current location of the user; acquiring a starting floor and a target floor of the user in the building complex; acquiring route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and guiding the user to the selected transporting carrier based on the route data.

In another embodiment, a device for guiding a user to ride a transporting carrier in a building complex is disclosed. The device includes a processor; and a memory for storing instructions executable by the processor, wherein the processor is configured to cause the device to determine a current location of the user; acquire a starting floor and a target floor of the user in the building complex; acquire route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and guide the user to the selected transporting carrier based on the route data.

In yet another embodiment, a non-transitory computer-readable storage medium having stored therein instructions is disclosed. The instructions, when executed by a processor of a terminal to guide a user of the terminal to ride a transporting carrier in a building complex, cause the terminal to determine a current location of the user; acquire a starting floor and a target floor of the user in the building complex; acquire route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and guide the user to the selected transporting carrier based on the route data.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments and do not represent all implementations consistent with the invention. Instead, they are merely examples of apparatuses and methods consistent with aspects related to the invention as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to"

Figure 1A:
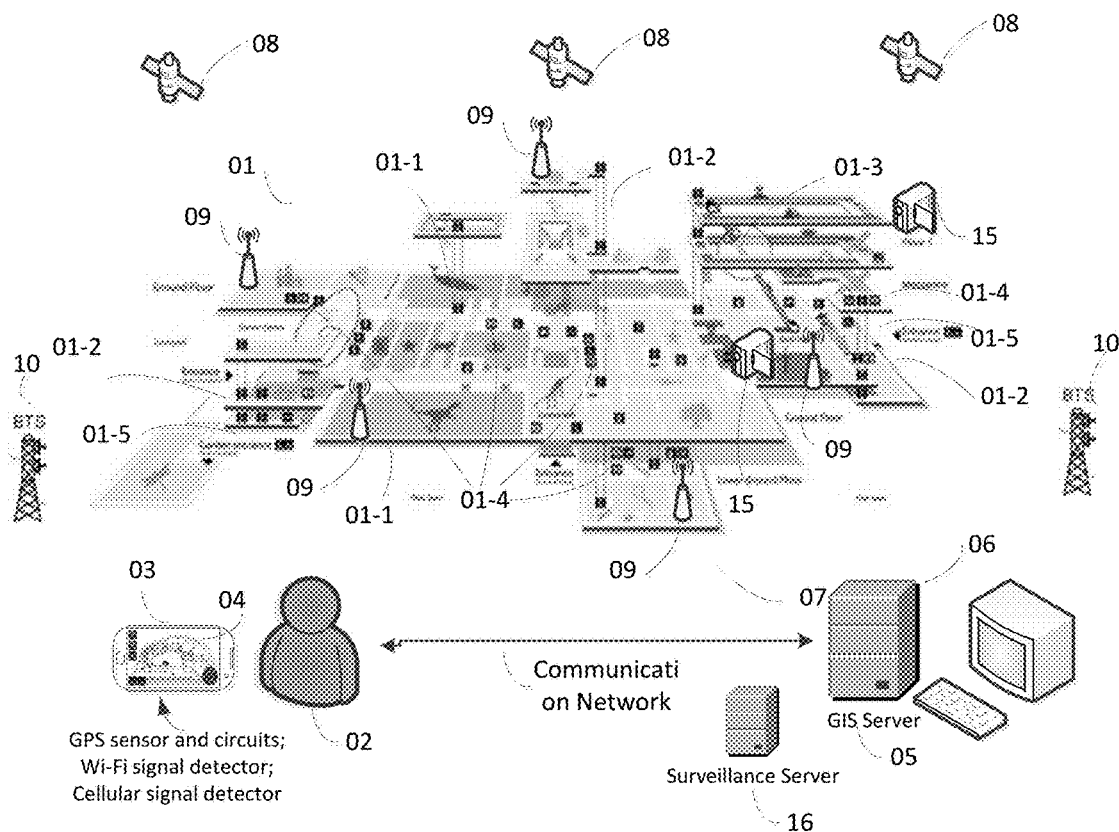
FIG. 1A illustrates the application context of the embodiments of the present disclosure.

By way of introduction and as shown in FIG. 1A, the embodiments described in this disclosure involve (1) an building complex 01 (such as a large museum or an indoor shopping mall) having various facilities such as stores/exhibit halls 01-1, elevators 01-2, escalators 01-3, restrooms 01-4, and entrances 01-5, (2) a user 02 having a mobile device 03 capable of running an indoor navigation application 04 (hereinafter referred to as "indoor navigation APP") and in communication via a communications network with an application server 06 supporting Geography Information System (GIS) 05 that maintains a three-dimensional model 07 of the building complex and information associated with the various facilities. The GIS application server provides an indoor navigation service to the user via the indoor navigation APP. The user may or may not need a user account to use the navigation functions of the indoor navigation APP. The embodiments below specifically use various user interfaces of the indoor navigation APP 04 in communication with the GIS application server 05 for navigating the user 02 between floors via appropriate type of transporting carriers (e.g., escalator or elevator) based on a starting and target floor and a current location of the user. An appropriate type of facility may be determined based on a difference between the starting and target floors. For example, a difference larger than a predetermined threshold may mean that elevators may be the more appropriate facility whereas a difference less than the predetermined threshold may mean that escalators may be the more appropriate facility to take.

For obtaining the current user location by the mobile device 03, Global Positioning System (GPS) technology may be used. Specifically, the mobile device may be equipped with GPS sensors that receives signal from a plurality of GPS satellites 08. The location may be determined by triangulation. Alternatively, the location of the mobile device may be determined based on an indoor positioning technology such as Wi-Fi location with the help of a Wi-Fi signal detector in the mobile device and a plurality of Wi-Fi access points 09 distributed in the building complex. The principle of Wi-Fi location will be explained below. Alternatively, the location of the mobile device may be determined based on a cellular location technology. Specifically, the mobile device may detect wireless signal characteristics from base stations 10 and the know geoposition of the base stations, as will be discussed in more details later. In all the location technologies above, the determination of the location of the mobile device may be performed by the mobile device itself. Alternatively, the detected signals by the mobile device (e.g., GPS, Wi-Fi, or cellular signal) may be communicated to a location server which calculates the location of the mobile device and communicate the calculated location to the mobile device.

The term "mobile device" is used interchangeably with terms such as mobile terminal, terminal device, and the like. A mobile device may be but is not limited to a mobile phone, a laptop computer, a tablet computer, a PDA, a game console, and a smart wearable device. The GIS application server may be referred to as GIS server and may be based on any type of hardware platform that may be centralized or distributed. The three-dimensional GIS model may be organized in a storage location of the GIS server in the form of database items. The GIS server may alternatively be a generic server running GIS software. The GIS server may be supported by any known operating system, such as Linux, Unix, and Windows. The communication network 08 may be based on wireless technologies, (such as cellular, Wi-Fi, and Bluetooth), wired technologies, and combination thereof.

Figure 1B:
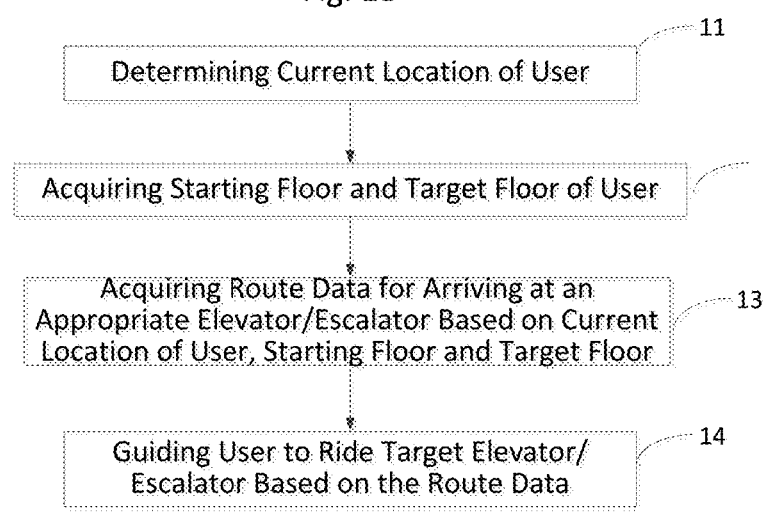
FIG. 1B is a flow chart illustrating a method for intelligently guiding a user to ride an elevator/escalator according to an exemplary embodiment of the present disclosure.

FIG. 1B is a flow chart illustrating a method for intelligently guiding a user to ride an elevator/escalator according to an exemplary embodiment. In step 11, a current location of the user is determined. The current location of the user may be represented by a longitude, a latitude, and an altitude. Alternatively, it may be represented by a direction and a distance to or from a known reference location within the three-dimensional model. When the user carrying the terminal is located in the building complex, the terminal may be capable of determining the current location of the user through various manners. In a first manner, the terminal may determine the current location of the user through a Global Positioning System based on satellite triangulation. In a second manner, the terminal may determine the current location of the user through a mobile positioning technology. For example, Cell of Origin (COO) technology may be used to determine the current location of the user carrying the terminal within a cellular system based on location of base stations that the terminal is registered with. In a third manner, the terminal may determine the current location of the user through an indoor positioning technology. The indoor positioning technology may be based on at least one of Bluetooth positioning, Zigbee positioning, or Wi-Fi positioning. As an example, the terminal may determine its current location through Wi-Fi fingerprint of the mobile device. Specifically, Wi-Fi signal characteristics (such as Received Signal Strength Indication (RSSI)) from each of a plurality of Access Points (APs) arranged at predetermined sites may be premeasured and pre-recorded (in the GIS server or some other server, for example) at various locations, forming a Wi-Fi fingerprint for each location. The terminal at an location to be determined may measure the Wi-Fi signal characteristics from these APs and compare the measurement to the pre-recorded fingerprints and from that, the location of the terminal may be derived. The comparison of the measurement with the pre-stored fingerprint and derivation of location of the terminal may be performed by the server, or alternatively, may be performed by the terminal by, e.g., downloading the pre-stored Wi-Fi fingerprints from the server.

In step 12, a starting floor and a target floor of the user are acquired. In one implementation, the starting floor of the user may be acquired based on the current location of the user acquired in step 11 (including altitude), with reference to the known digital three dimensional geographic model of the building complex. In an alternative implementation, the indoor navigation APP may be started and used to receive a user input in a user interface of the APP as the starting floor. Similarly, the target floor may be acquired based on user input via the user interface of the APP. Herein, the term "target floor" may be interchangeably referred to as "destination floor".

Figure 2:
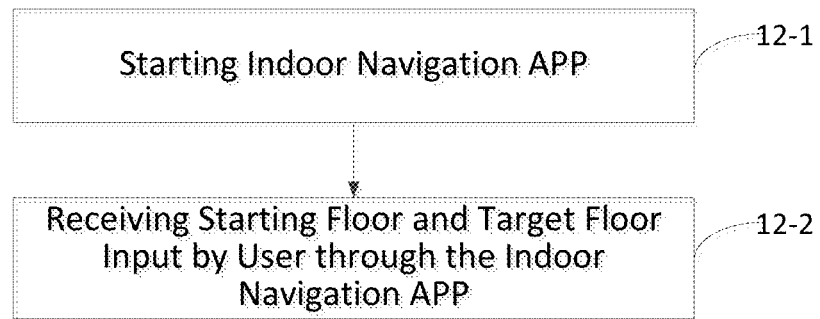
FIG. 2 is a flow chart illustrating an implementation of step 12 of FIG. 1B.
Figure 3:
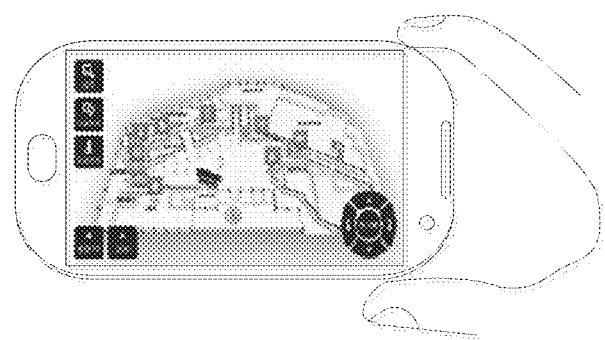
FIG. 3 is illustrates an application scenario for intelligently guiding a user to ride an elevator/escalator using an indoor navigation application running on a mobile device according to an exemplary embodiment of the present disclosure.

FIG. 2 is a flow chart illustrating an exemplary implementation of step 12 of FIG. 1B involving the indoor navigation APP. Step 12 may be implemented by sub-steps 12-1 and 12-2. In sub-step 12-1, the indoor navigation application APP is started. The indoor navigation application APP may be started in response to a user input. The user input may be a user identity and verification information (e.g., password) associated with a user account for the indoor navigation service. The indoor navigation APP communicates with the remote GIS application server for user account verification. The user may input the user identity and verification information via a login user interface of the indoor navigation APP. Upon verification, the APP may proceed to navigation interfaces. Alternatively, the navigation service may not require input of user account and the user input for start the navigation interfaces may be a designated action. For example, the designated user action may be a double clicks on the icon of the indoor navigation APP. Detected user action may be compared to the designated action and if there is a match, the indoor navigation application APP is started and a corresponding navigation interface (default home interface of the indoor navigation APP, for example) is presented to the user. The indoor navigation APP may be alternatively started based on a current location of the user being within a preset geographic range rather than based on a user input. For example, after the current location of the user is determined in step 11, it may be further determined whether the user is within a particular building complex. When the user is located within the shopping mall, the indoor navigation APP is started and the default navigation interface is presented to the user. FIG. 3 illustrates a diagram showing an exemplary navigation interface of the indoor navigation APP after it is being started. In sub-step 12-2, the starting floor and the target floor input by the user through the indoor navigation APP are received.

Figure 4A:
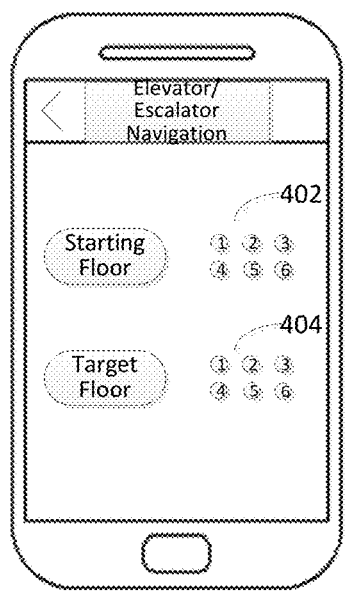
FIGS. 4A-4C illustrate exemplary interfaces of the indoor navigation application running on the mobile device for inputting a starting floor and target floor.
Figure 4B:
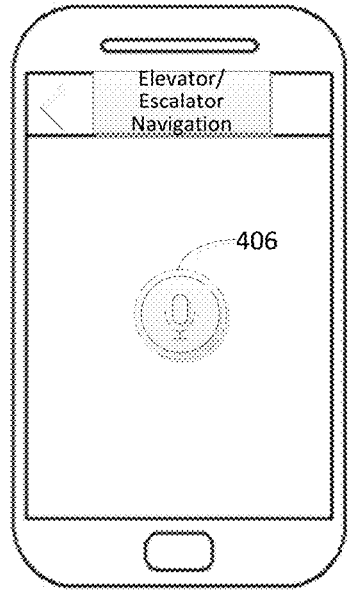
Figure 4C:
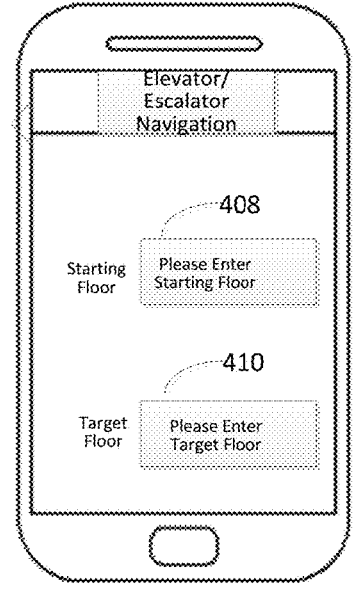

The indoor navigation APP may provide various functions, such as searching for a designated store, searching for public facilities such as a restroom and an elevator/escalator. The indoor navigation APP may also be configured to display information about products on shelves of particular stores or items exhibited in a particular exhibit hall. In the present disclosure, the function of the indoor navigation APP in searching for an elevator/escalator is described as an example. For the elevator/escalator searching function, the indoor navigation APP may provide a corresponding user interface hereinafter referred to as "elevator/escalator navigation" interface. This interface provides user with an input sub-interface for inputting the starting floor and the target floor by the user. The input sub-interface may take various forms. For example, as shown by FIG. 4A, the user inputs for starting and target floors are respectively via selection buttons 402 and 404 on a touch screen of the terminal. Alternatively, as shown in FIG. 4B, the user may input the starting and target floors via voice recognition. For example, a voice input button 406 may be provided and upon pressing the button, the user may speak the starting and target floor information into a microphone of the terminal. For example, the user may say "from first floor to sixth floor" into the microphone. Accordingly, the indoor navigation APP may recognize the voice input signal, and set the starting floor as the first floor, and the target floor as the sixth floor. The voice input may also be based on standard interface provided by an operating system of the terminal (such as Google Voice and Apple Ski). Alternatively, as shown in FIG. 4C, the user may input the starting and target floors by text input. Specifically, the user may press buttons 408 and 410 and then type in the starting and target floors in a corresponding text box. The user may perform the typing through a soft keyboard or other typing interface provided by the operating system of the terminal.

Figure 5:
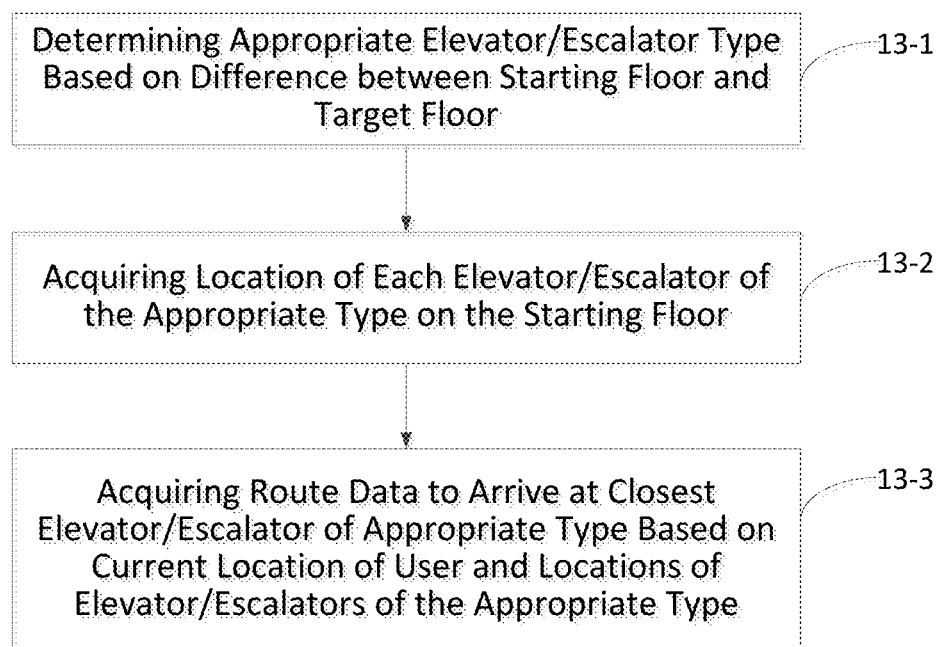
FIG. 5 is a flow chart illustrating an implementation of step 13 of FIG. 1B.
Figure 6:
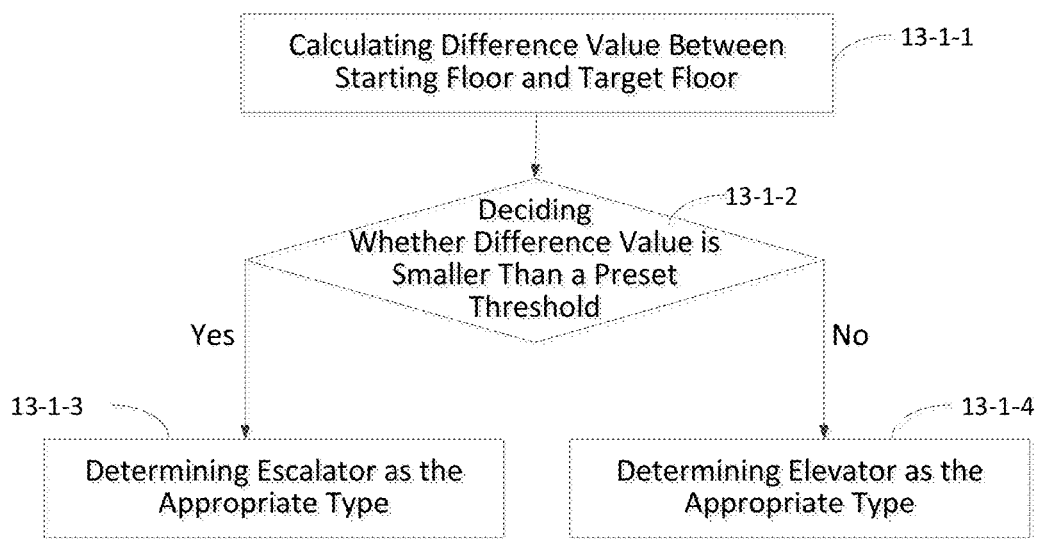
FIG. 6 is a flow chart illustrating an implementation of step 13-1 of FIG. 5.

Back to FIG. 1B and in step 13, route data for arriving at a target elevator/escalator is acquired based on the current location of the user, the starting floor and the target floor. FIG. 5 is a flow chart illustrating a specific implementation of step 13 comprising sub-step 13-1, 13-2, and 13-3. In sub-step 13-1, an elevator/escalator type suitable for carrying the user from the starting floor to the target floor, or an appropriate type, is determined based on a difference between the starting floor and the target floor. For example, if starting floor and target floor is far apart, then an elevator may be the more appropriate type. Otherwise, an escalator may be appropriate. FIG. 6 illustrates an implementation of sub-step 13-1: (1) a difference value between the starting floor and the target floor is calculated in 13-1-1, (2) it is determined whether the difference value is smaller than a preset threshold in 13-1-2, (3) if the difference value is smaller than the preset threshold, an escalator is taken as the appropriate type in 13-1-3, and (4) if the difference value is not smaller than the preset threshold, an elevator is taken as the appropriate type. For example, the indoor navigation APP may preset the threshold at 3 and accordingly, if the difference value between the starting and target floors is smaller than 3, an escalator is recommended to the user; and if the difference value is 3 or larger, an elevator is recommended to the user. Thus, for a starting floor of 6 and a target floor of 4 (difference value is 2), the indoor navigation APP would recommend the user to ride an escalator to arrive at the target floor. However, for a starting floor of 1 and a target floor of 6 (difference value is 5), the indoor navigation application APP would recommends the user to ride an elevator to arrive at the target floor according to the threshold of 3 above. The above elevator can include a passenger elevator or a cargo elevator.

Figure 7:
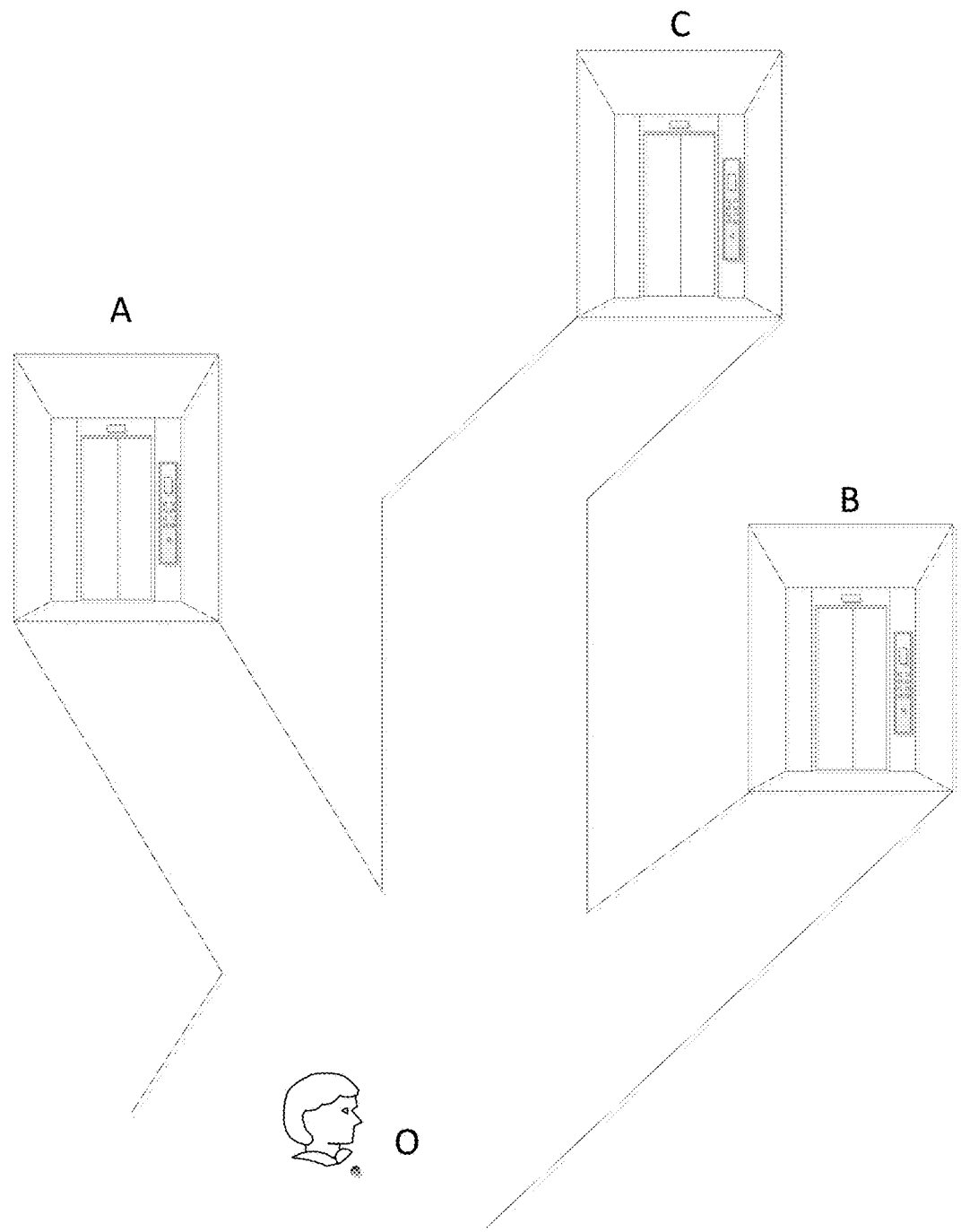
FIG. 7 illustrates an exemplary application scenario of intelligently guiding a user to ride an elevator in a building complex.

In sub-step 13-2 of FIG. 6, a location of each appropriate type of elevator/escalator on the starting floor is acquired. An exemplary implementation scenario of sub-step 13-2 is illustrated in FIG. 7 for a target type of elevator. Locations of all elevators on the current floor where the user is located may be acquired from the GIS server. For example, the user may be currently on the first floor and there may be 3 elevators on the first floor, labeled as A, B and C in FIG. 7, respectively corresponding to a first location, a second location and a third location. In sub-step 13-3 of FIG. 6, route data for reaching the closest elevator/escalator of the appropriate elevator/escalator type is acquired based on the current location of the user and the locations of the appropriate type of elevator/escalators. Following the example of FIG. 7 and assuming that the current location of the user is at O, length of routs OA, OB and OC may each be calculated, and the route with the shortest length may be taken as the route data. For example, after the calculation and comparison, it may be determined that the elevator B is the closest to the user, and thus, the route data for arriving at the elevator B is acquired. The implementation above applies to the scenario where escalator rather than elevator is the appropriate type in a similar way. That is, locations of all escalators rather than elevators on the current floor are acquired and route data to the closest escalator rather than elevator is generated. Optionally, for determining an escalator closest to the user, not only distances to the escalators on the same floor are considered, other additional factors may be further considered. For example, unlike elevators that are typically running through all the floors, escalators takes passengers from floor to floor and thus may not reach all the floors. Thus, the indoor navigation APP may advantageously acquire the locations of escalators on the target floor and determine whether a direct escalator path exists between the starting and target floors. If a direct path exists, then that path may be set as a preferred path. If there are multiple direct paths, then the one with an escalator on the starting floor that is closest to the current user location may be used for calculating routing data. If no direct path exist and the user needs to move from one escalator to another, then escalator on the starting floor having the shortest distance to the user may be selected. Further, when there is no direct path, then the indoor navigation APP may switch to finding an elevator rather than escalator path as described above.

Returning again to FIG. 1B and in step 14, the user is guided to ride the selected elevator/escalator based on the route data being represented in the navigation sub-interface of the indoor navigation APP. Specifically, the GIS may provide the three-dimensional visualization model of the building complex to the indoor navigation APP for navigation. For example, in a large-scale shopping mall, the route data can be incorporated and overlaid on the three-dimensional visualization model intuitively displayed on the terminal. The route data may include but are not limited to length of the route, directions, and names of the stores along the way. These data may be displayed in the three-dimensional visualization model as symbols such as arrows, highlights, and overlaid texts, similar to automobile navigation. The route data may further be voiced to the user via the indoor navigation APP. For example, a speech "turn left, go straight for 30 meters, turn right, and arrive at elevator B" may be synthesized and voiced to the user as navigation instructions.

Thus, in the embodiment of FIG. 1B discussed above for intelligently guiding a user to ride an elevator/escalator by utilizing the GIS database of a large-scale building complex, elevator/escalator routes may be automatically recommended to the user and route data for arriving at an appropriate elevator/escalator on the starting floor may be generated. Based on the route data, the user is guided to the selected elevator/escalator. Thereby, intelligent indoor navigation service may be provided to the user in the large building complex, enhancing user's visiting experience.

Further, an escalator is different from an elevator in that a particular escalator may run only in one direction whereas an elevator runs both ways. Thus, it may not be enough for the indoor navigation APP to only maintain the locations of the escalators. The indoor navigation APP may need to additionally take into consideration the running direction of each escalator. Further, the running direction of each escalator may be reversed from a normal running direction in a large building complex from time to time to adapt to changing flow of traffic. Thus, in some situations, actual running direction of the escalator may be opposite to the running direction recorded by default in the GIS database. In some other situations, the two adjacent escalators that normally run in opposite directions may be actually running in the same direction that is opposite to what the user and the indoor navigation APP need and may have predicted. The embodiment below and as illustrated in FIG. 8 is intended for correcting this type of errors.

Figure 8:
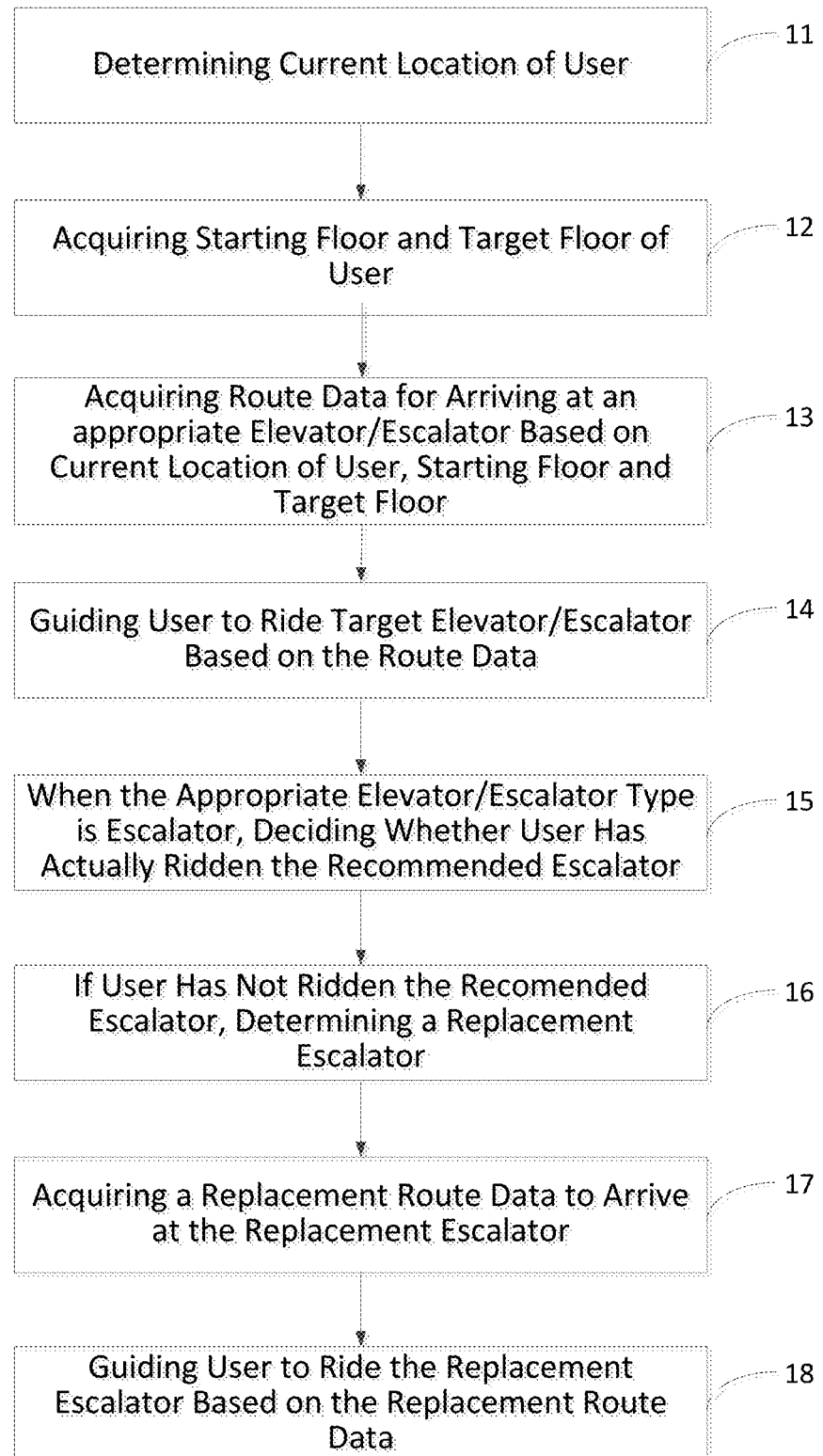
FIG. 8 is a flow chart illustrating another method for intelligently guiding a user to ride an elevator/escalator according to an exemplary embodiment of the present disclosure.

Specifically, FIG. 8 shows a flow chart illustrating another method for intelligently guiding a user to ride an elevator/escalator based on the embodiment shown in FIG. 1B but further comprising steps 15, 16, 17, and 18. In step 15, when the appropriate elevator/escalator type is an escalator, the indoor navigation APP may decide whether the user has actually ridden a recommended escalator. In one implementation of step 15, the indoor navigation APP may determine whether the user has ridden an escalator based on a monitoring or surveillance video. For example, monitoring video data taken by surveillance cameras (shown as 15 in FIG. 1A) may be obtained by the indoor navigation app from a surveillance server (may or may not be the GIS server, shown as 16 in FIG. 1A)) of the shopping mall, and image processing may be used for deciding whether the user has changed his course of movement upon arriving at the recommended escalator. The Surveillance server may be in communication with the indoor navigation app of the mobile device via the communication network of FIG. 1A. The imaging processing may be performed by the mobile device or may be performed by the surveillance server with the results communicated to the mobile device. In an alternative implementation of step 15, the indoor navigation APP may monitor the movement of the user and determine whether the user's movement path has overlap with the location of the recommended elevator within period of time that may be predicted based on the distance to the elevator and some average walking speed. In another alternative implementation of step 15, the indoor navigation APP may decide whether the user has ridden the target escalator by making an inquiry to the user. For example, after the indoor navigation system detects that the user has arrived at the first escalator to be ridden, an escalator confirmation interface may be presented to the user on the terminal for querying the user whether the running direction of the escalator is correct through, e.g., a dialog box, a selection button, voice prompt, or the like.

In step 16, if the user has not ridden the recommended escalator, the indoor navigation APP may assume that the escalator may be running in the wrong direction and proceed to identify a replacement escalator. In step 17, replacement route data to the replacement escalator is acquired based on the current location of the user and the location of the replacement escalator. In step 18, the user is guided to ride the replacement escalator based on the replacement route data in similar manner as described above for step 14.

Thus, in the present disclosure, when the appropriate elevator/escalator type is an escalator, additional steps may be provided step 14 of FIG. 1B for guiding the user to a replacement escalator when it is detected that the user has not ridden the target escalator as recommended (and thus assumed that the running direction of the current escalator is wrong).

For convenient in description, the above disclosed method embodiments are described as combination of a series of steps. However, it should be appreciated by those skilled in the art that, the present disclosure is not limited to the described order of performance. Therefore, some steps can be performed in other alternative orders or performed simultaneously according to the present disclosure. Further, the description for method embodiments above applies to corresponding devices designed to implement these methods.

Figure 9:
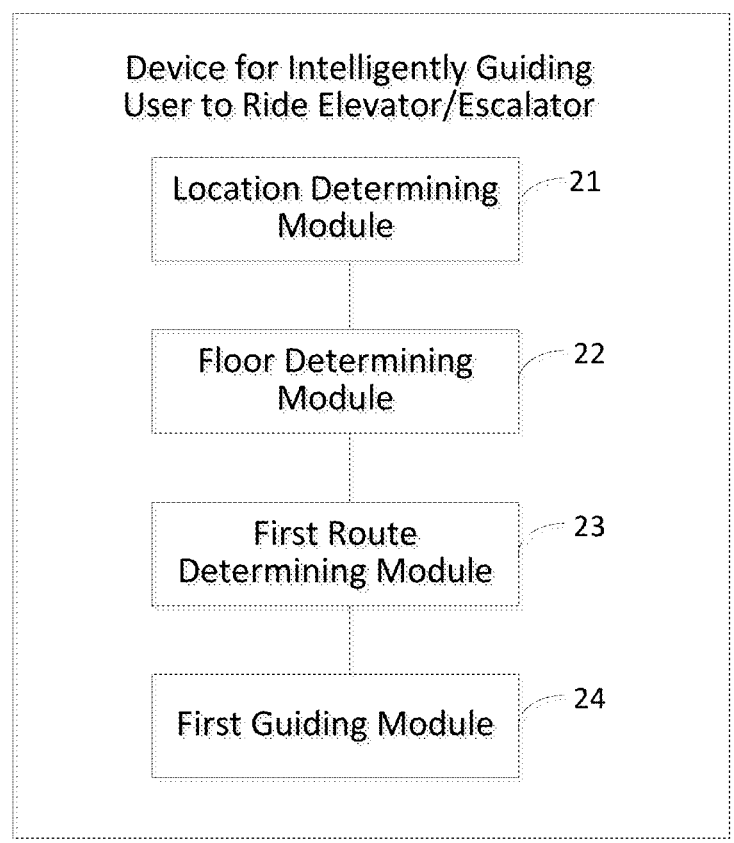
FIG. 9 is a block diagram of a device for intelligently guiding a user to ride an elevator/escalator according to an exemplary embodiment of the present disclosure.

FIG. 9 is a block diagram of a device for intelligently guiding a user to ride an elevator/escalator according to an exemplary embodiment of the present disclosure. As shown in FIG. 9, the device includes a location determining module 21 configured to determine a current location of the user; a floor determining module 22 configured to acquire a starting floor and a target floor of the user; a first route determining module 23 configured to acquire route data for arriving at a target elevator/escalator based on the current location of the user, the starting floor and the target floor; and a first guiding module 24 configured to guide the user to ride the target elevator/escalator based on the route data.

Figure 10:
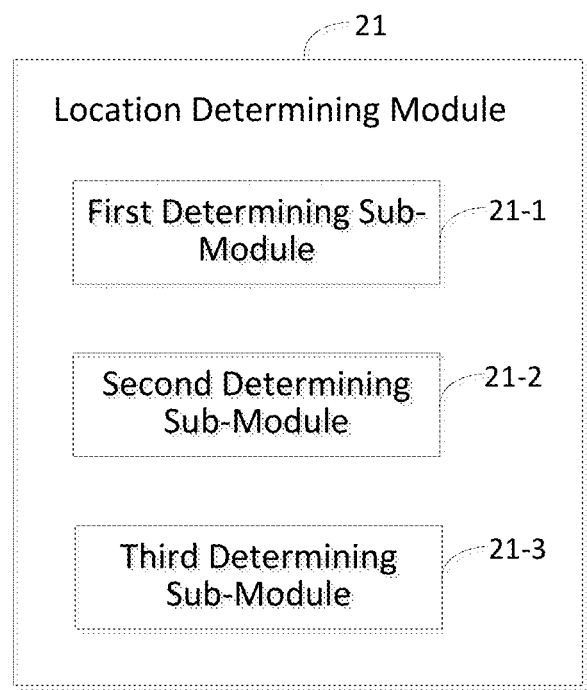
FIG. 10 is a block diagram of an exemplary implementation of module 21 of FIG. 9.

FIG. 10 is a block diagram of an exemplary location determining module 21 of FIG. 9. The location determining module 21 may include a first determining sub-module 21-1 configured to determine the current location of the user through a Global Positioning System; a second determining sub-module 21-2 configured to determine the current location of the user through mobile positioning technology; and a third determining sub-module 21-3 configured to determine the current location of the user through indoor positioning technology.

Figure 11:
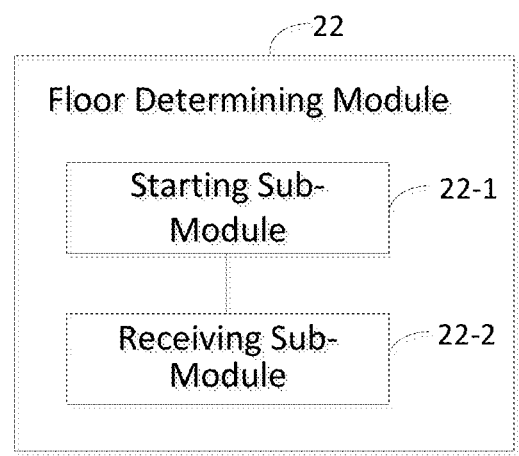
FIG. 11 is a block diagram of an exemplary implementation of module 22 of FIG. 9.
Figure 12:
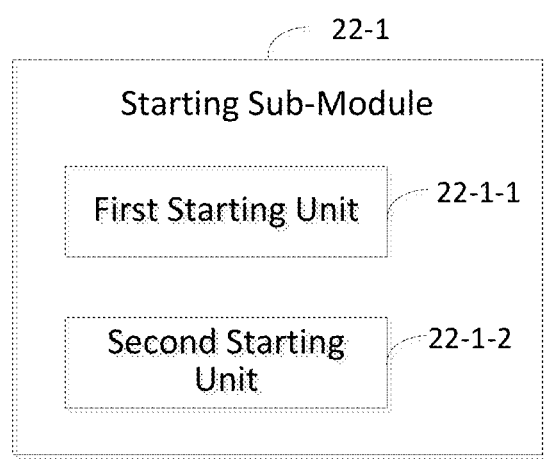
FIG. 12 is a block diagram of an exemplary implementation of sub-module 22-1 of FIG. 11.

FIG. 11 is a block diagram of an exemplary floor determining module 22 of FIG. 9. The floor determining module 22 may include a starting sub-module 22-1 configured to start an indoor navigation APP and a receiving sub-module 22-2 configured to receive the starting floor and the target floor input by the user through the indoor navigation APP. One implementation of the starting sub-module 22-1 is illustrated in FIG. 12 in which the starting sub-module 22-1 may include a first starting unit 22-1-1 configured to start the indoor navigation APP in response to an operational instruction input by the user for starting the indoor navigation APP or a second starting unit 22-1-2 configured to start the indoor navigation APP upon monitoring the current location of the user is within a preset distance range.

Figure 13:
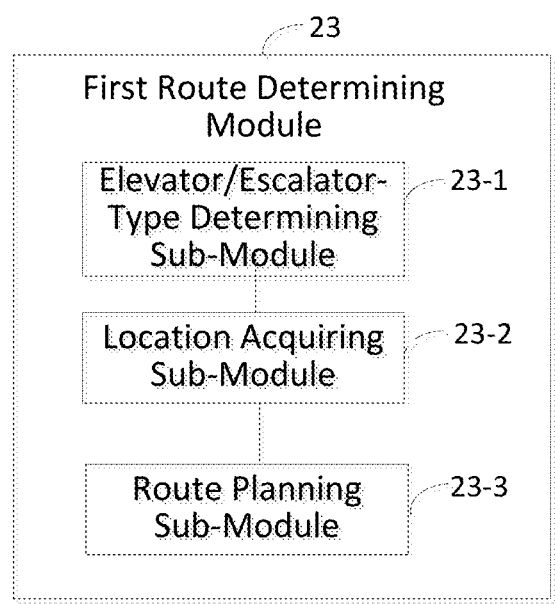
FIG. 13 is a block diagram of an exemplary implementation of module 23 of FIG. 9.
Figure 14:
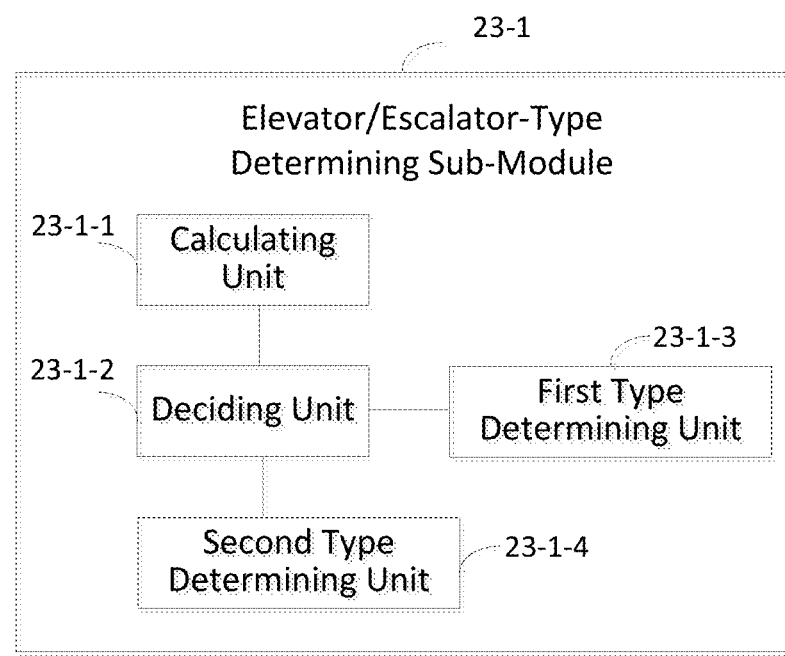
FIG. 14 is a block diagram of an exemplary implementation of module 23-1 of FIG. 13.

FIG. 13 is a block diagram of an exemplary first route determining module 23 of FIG. 9. The first route determining module 23 may include an elevator/escalator-type determining sub-module 23-1 configured to determine a type of appropriate elevator/escalator based on a difference between the starting floor and the target floor; a location acquiring sub-module 23-2 configured to acquire a location of each elevator/escalator of the appropriate elevator/escalator type on the starting floor; and a route planning sub-module 23-3 configured to acquire route data to arrive at a closest appropriate type of elevator/escalator based on the current location of the user and all of the locations of the appropriate type of elevator/escalators. An exemplary implementation of the elevator/escalator-type determining submodule 23-1 is illustrated in FIG. 14, in which the elevator/escalator-type determining sub-module 23-1 may include a calculating unit 23-1-1 configured to calculate a difference value between the starting floor and the target floor; a deciding unit 23-1-2 configured to decide whether the difference value is smaller than a preset threshold; a first type determining unit 2-3-13 configured to, if the difference value is smaller than the preset threshold, determine an escalator as the appropriate elevator/escalator type; and a second type determining unit 23-1-4 configured to, if the difference value is larger than or equal to the preset threshold, determine an elevator as the appropriate elevator/escalator type.

Figure 15:
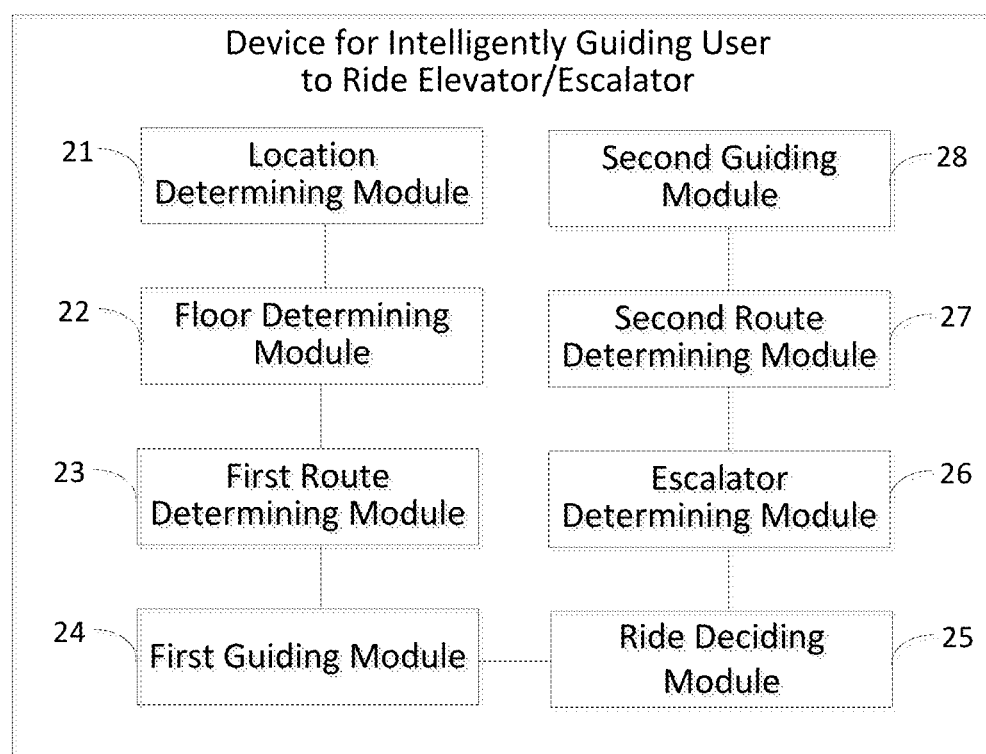
FIG. 15 is a block diagram of another device for intelligently guiding a user to ride an elevator/escalator according to an exemplary embodiment of the present disclosure.

FIG. 15 is a block diagram of another device for intelligently guiding a user to ride an elevator/escalator based on the embodiment shown in FIG. 9. The device may further include a ride deciding module 25 configured to, when the appropriate elevator/escalator type is an escalator, decide whether the user has actually ridden a target escalator; an escalator determining module 26 configured to, if the user has not ridden the target escalator, identify a second escalator; a second route determining module 27 configured to acquire second route data to arrive at the second escalator; and a second guiding module 28 configured to guide the user to ride the second escalator based on the second route data.

Figure 16:
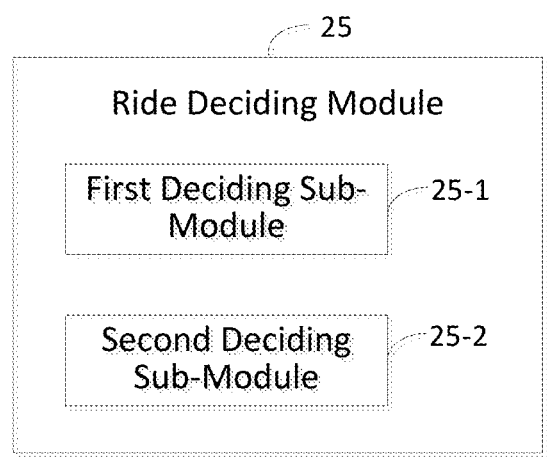
FIG. 16 is a block diagram of an exemplary implementation of module 25 of FIG. 15.

FIG. 16 is a block diagram of an implementation of the ride deciding module 25 of FIG. 15. The ride deciding module 25 may include a first deciding sub-module 25-1 configured to decide whether the user has ridden the target escalator based on a monitoring/surveillance video; or a second deciding sub-module 25-2 configured to decide whether the user has actually ridden the target escalator by querying the user.

Implementation of the functions and operations of the modules in the above devices can be specifically referred to the implementation of the corresponding steps in the above methods. Examples described for the implementation of the methods applies to the device embodiments. The device embodiments described above are merely illustrative. The units described as separate may be or may not be physically separate, and the components illustrated as units may be or may not be physical units, and may be at the same location, or may be distributed to multiple units over the network. A part of or all of the modules can be selected to achieve the objective of the present disclosure as desired.

Figure 17:
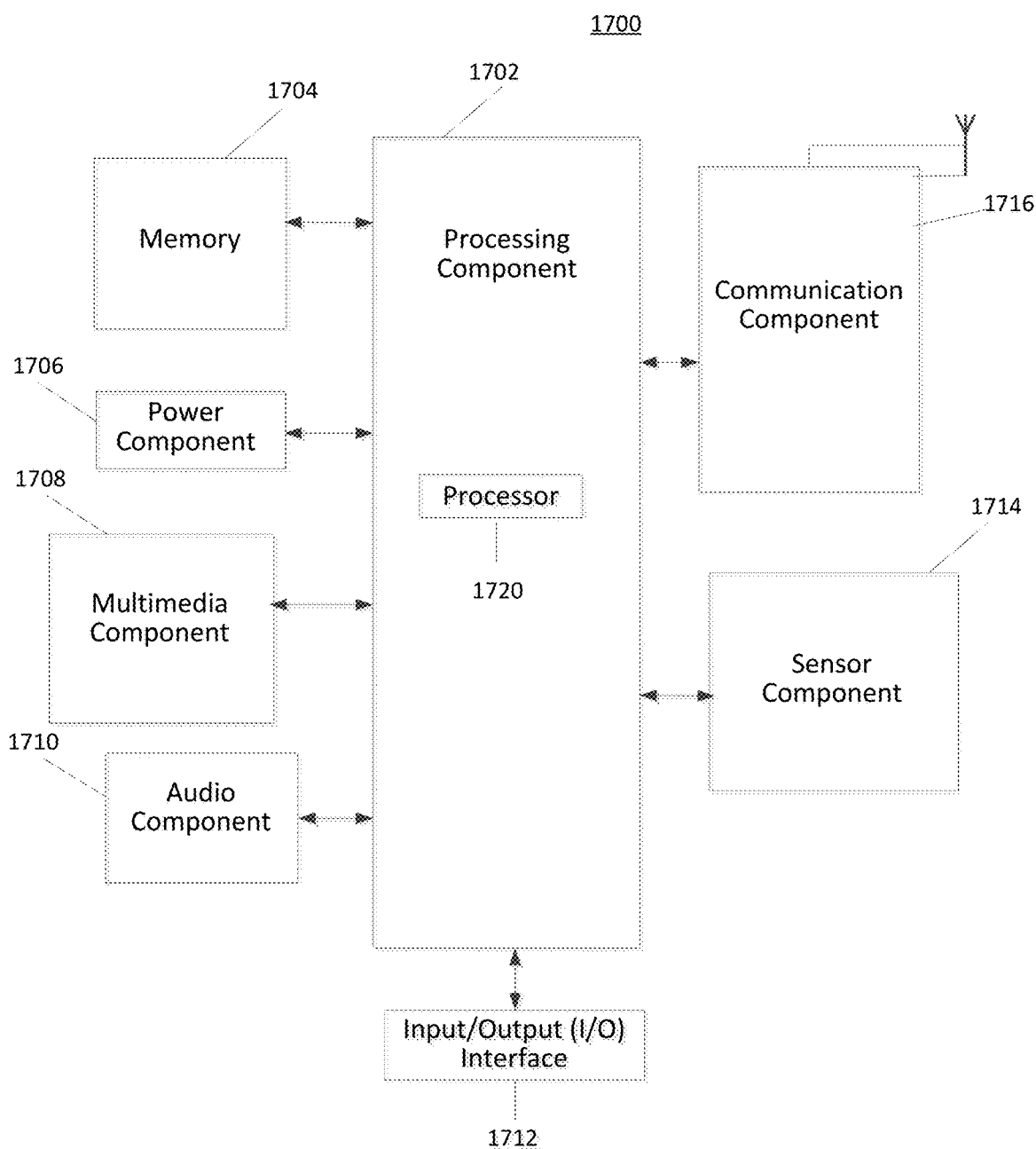
FIG. 17 is a block diagram of another device for intelligently guiding a user to ride an elevator/escalator according to an exemplary embodiment of the present disclosure.

FIG. 17 is a block diagram of a device 1700 for intelligently guiding a user to ride an elevator/escalator according to an exemplary embodiment. For example, the device 1700 may be a terminal of a user, such as a smart phone, a Personal Digital Assistant (PDA), a smart bracelet and other smart terminals.

Referring to FIG. 17, the device 1700 can include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 controls overall operations of the device 1700, such as the operations associated with display, telephone calls, data communications, camera operations, and recording operations. The processing component 1702 can include one or more processors 1720 to execute instructions to perform all or part of the steps in the above described methods. Moreover, the processing component 1702 can include one or more modules which facilitate the interaction between the processing component 1702 and other components. For instance, the processing component 1702 can include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 can include a power management system, one or more power sources, and any other components associated with the generation, management, and distribution of power in the device 1700.

The multimedia component 1708 includes a display screen providing an output interface between the device 1700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 1708 includes a front camera and/or a rear camera. The front camera and the rear camera can receive an external multimedia datum while the device 1700 is in an operation mode, such as a photographing mode or a video mode. Each of the front camera and the rear camera can be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal can be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons can include, but are not limited to, a home button, a volume button, a starting button, and a locking button.

The sensor component 1714 includes one or more sensors to provide status assessments of various aspects of the device 1700. For instance, the sensor component 1714 can detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 can include a proximity sensor configured to detect the presence of nearby objects without any physical contact. The sensor component 1714 can also include a light sensor, such as a CMOS or CCD image sensor, for use in imaging applications. In some embodiments, the sensor component 1714 can also include an accelerometer sensor, a gyroscope sensor, a magnetic sensor, a pressure sensor, or a temperature sensor or thermometer.

The communication component 1716 is configured to facilitate communication, wired or wirelessly, between the device 1700 and other devices. The device 1700 can access a wireless network based on a communication standard, such as WiFi, 2G, 3G, LTE or 4G technologies, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

The memory 1704 above may be configured to store instructions executable fy the processor 1720. The processor, when executing these instructions may cause the device 1700 to perform the indoor navigation methods described above.

Each module, submodule, or unit discussed above for FIG. 9-16, such as the location determining module, the floor determining module, the first route determining module, the first guiding module, the first determining sub-module, the second determining sub-module, the third determining sub-module, the starting sub-module, the receiving sub-module, the first starting unit, the second starting unit, the elevator-escalator-type determining sub-module, the location acquiring sub-module, the route planning sub-module, the calculating unit, the deciding unit, the first type determining unit, the second type determining unit, the ride deciding module, the escalator determining module, the second route determining module, the second guiding module, the first deciding sub-module, the second deciding-submodule may take the form of a packaged functional hardware unit designed for use with other components, a portion of a program code (e.g., software or firmware) executable by the processor 1720 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for guiding a user to ride a transporting carrier by a mobile terminal in a building complex, comprising:
    determining a current location of the user;
    acquiring a starting floor and a target floor of the user in the building complex;
    acquiring route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and
    guiding the user to the selected transporting carrier based on the route data,
    wherein acquiring route data for arriving at the selected transporting carrier comprises:
        selecting based on a number difference between the starting floor and the target floor the appropriate transporting carrier type from the at least two transporting carrier types;
        acquiring a location of each transporting carrier of the at least one transporting carrier of the selected transporting carrier type on the starting floor; and
        acquiring route data for arriving at a closest transporting carrier of the selected transporting carrier type based on the current location of the user and the location of each transporting carrier of the selected transporting carrier type.

2. The method of claim 1, wherein determining the current location of the user comprises at least one of:
    obtaining by the mobile terminal the current location of the user through a Global Positioning System;
    obtaining by the mobile terminal the current location of the user through mobile cellular positioning system; and
    obtaining by the mobile terminal the current location of the user through an indoor positioning system.

3. The method of claim 1, wherein acquiring the starting floor and the target floor of the user comprises:
    starting an indoor navigation application on the mobile terminal; or
    receiving the starting floor and the target floor input by the user through an input interface of the indoor navigation application.

4. The method of claim 3, wherein the indoor navigation application is started by at least one of:
    starting the indoor navigation application in response to an user input for starting the indoor navigation application; or
    starting the indoor navigation application upon automatically determining that the current location of the user is within a preset distance range from the building complex.

5. The method of claim 1, wherein selecting the appropriate type of transporting carrier based on the number difference between the starting floor and the target floor comprises:
    calculating the number difference between the starting floor and the target floor;
    selecting an escalator as the appropriate type of transporting carrier when the calculated number difference is smaller than a preset threshold; and
    selecting the elevator as the appropriate type of transporting carrier when the calculated number difference is larger than or equal to the preset threshold.

6. The method of claim 5, further comprising:
    determining whether the user has ridden the selected transporting carrier when the appropriate type of transporting carrier is the escalator type;
    determining a replacement escalator when the user has not ridden the selected escalator within a predefined period of time;
    acquiring replacement route data for arriving at the replacement escalator; and
    guiding the user to the replacement escalator based on the replacement route data.

7. The method of claim 6, wherein determining whether the user has ridden the selected transporting carrier when the appropriate type of transporting carrier is the escalator type comprises at least one of
    determining whether the user has ridden an escalator based on a monitoring video taken from a surveillance camera; or
    determining whether the user has ridden an escalator by querying the user.

8. A device for guiding a user to ride a transporting carrier in a building complex, comprising:
    a processor; and
    a memory for storing instructions executable by the processor,
    wherein the processor is configured to cause the device to:
        determine a current location of the user;
        acquire a starting floor and a target floor of the user in the building complex;
        acquire route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and
        guide the user to the selected transporting carrier based on the route data,
    wherein acquiring route data for arriving at the selected transporting carrier comprises:
        selecting based on a number difference between the starting floor and the target floor the appropriate transporting carrier type from the at least two transporting carrier types;
        acquiring a location of each transporting carrier of the at least one transporting carrier of the selected transporting carrier type on the starting floor: and
        acquiring route data for arriving at a closest transporting carrier of the selected transporting carrier type based on the current location of the user and the location of each transporting carrier of the selected transporting carrier type.

9. The device of claim 8, wherein to determine the current location of the user, the processor is configured to cause the device to perform at least one of:
    obtaining the current location of the user through a Global Positioning System;

obtaining the current location of the user through mobile positioning technology; or obtaining the current location of the user through indoor positioning technology.

10. The device of claim 8, wherein to acquire the starting floor and the target floor of the user, the processor is configured to cause the device to:

start an indoor navigation application; and receive the starting floor and the target floor input by the user through an input interface of the indoor navigation application.

11. The device of claim 10, wherein to start the indoor navigation application, the processor is configure to cause the device to perform at least one of:

starting the indoor navigation application in response to an user input for starting the indoor navigation application; or starting the indoor navigation application upon automatically determining that the current location of the user is within a preset distance range from the building complex.

12. The device of claim 8, wherein to select the appropriate transporting carrier type based on the number difference between the starting floor and the target floor, the processor is configured to cause the device to:

calculate the number difference between the starting floor and the target floor;

select the escalator type as the appropriate transporting carrier type when the calculated number difference is smaller than a preset threshold; and select the elevator type as the appropriate transporting carrier type when the calculated number difference is larger than or equal to the preset threshold.

13. The device of claim 12, wherein the processor is further configured to cause the device to:

determine whether the user has ridden the selected transporting carrier when the appropriate transporting carrier type is the escalator type;

determine a replacement escalator when the user has not ridden the selected escalator within a predefined period of time;

acquire replacement route data for arriving at the replacement escalator; and guide the user to ride the replacement escalator based on the replacement route data.

14. The device of claim 13, wherein to determine whether the user has ridden the selected transporting carrier when the appropriate transporting carrier type is the escalator type, the processor is configured to cause the device to perform at least one of:

determining whether the user has ridden an escalator based on a monitoring video taken from a surveillance camera; or determining whether the user has ridden an escalator by querying the user.

15. A non-transitory computer-readable storage medium having stored therein instructions that, when executed by a processor of a terminal to guide a user of the terminal to ride a transporting carrier in a building complex, cause the terminal to:

determine a current location of the user;

acquire a starting floor and a target floor of the user in the building complex;

acquire route data based on the current location of the user, the starting floor, and the target floor for arriving at a selected transporting carrier of the building complex from at least one transporting carrier of an appropriate transporting carrier type selected from at least two transporting carrier types comprising at least an elevator type and an escalator type; and guide the user to the selected transporting carrier based on the route data, wherein acquiring route data for arriving at the selected transporting carrier comprises:

selecting based on a number difference between the starting floor and the target floor the appropriate transporting carrier type from the at least two transporting carrier types;

acquiring a location of each transporting carrier of the at least one transporting carrier of the selected transporting carrier type on the starting floor: and acquiring route data for arriving at a closest transporting carrier of the selected transporting carrier type based on the current location of the user and the location of each transporting carrier of the selected transporting carrier type.

16. The non-transitory computer-readable storage medium of claim 15, the instructions, when executed by the processor of the terminal to select the appropriate transporting carrier type based on the number difference between the starting floor and the target floor, cause the terminal to:

calculate the number difference between the starting floor and the target floor;

select escalator as the appropriate transporting carrier type when the calculated number difference is smaller than a preset threshold; and select elevator as the appropriate transporting carrier type when the calculated number difference is larger than or equal to the preset threshold.

17. The non-transitory computer-readable storage medium of claim 16, the instructions, when executed by the processor of the terminal, further cause the terminal to:

determine whether the user has ridden the selected transporting carrier when the appropriate transporting carrier type is the escalator type;

determine a replacement escalator when the user has not ridden the selected escalator within a predefined period of time;

acquire replacement route data for arriving at the replacement escalator; and guide the user to ride the replacement escalator based on the replacement route data.

* * * * *